H. M. PARSHALL.
OIL AND LIQUID PUMP.
No. 179,864. Patented July 18, 1876.
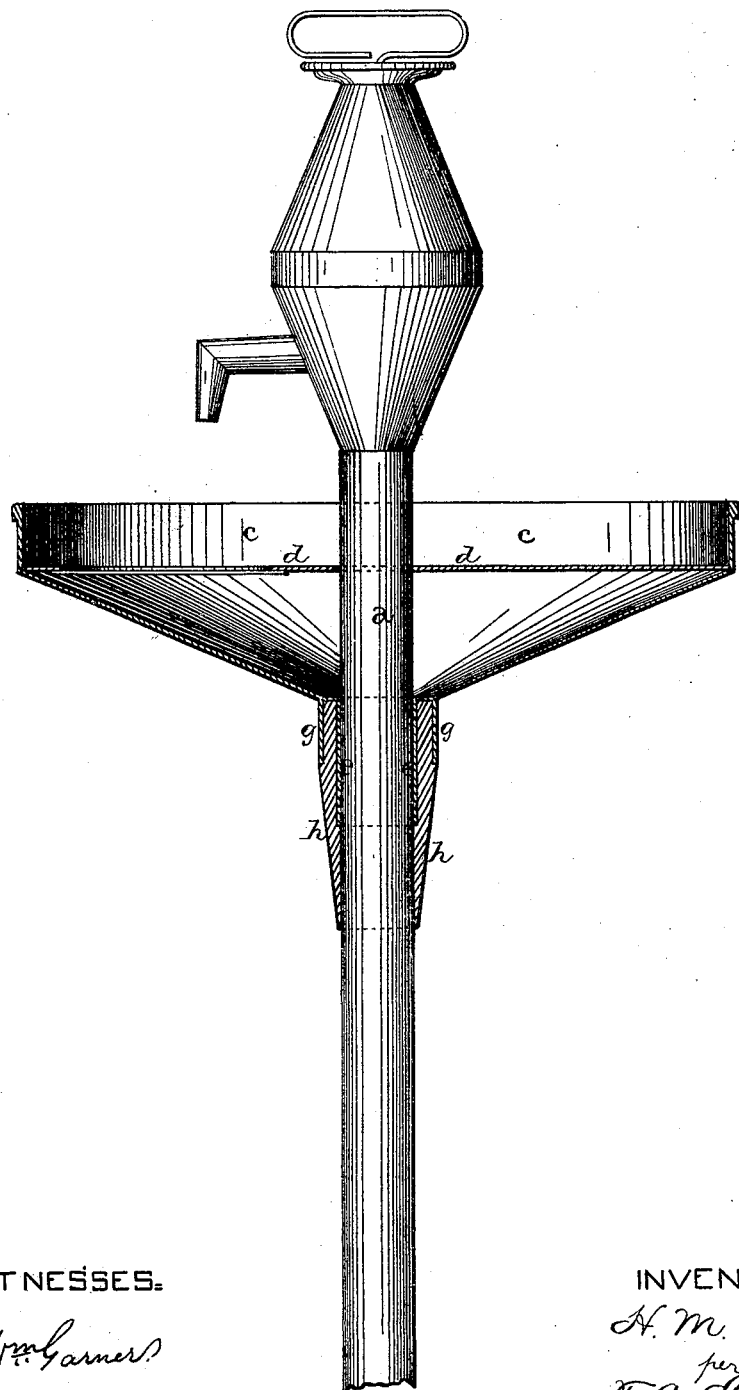
WITNESSES:
Wm. Garner
F. M. Burnham
INVENTOR:
H. M. Parshall
per F. A. Lehmann, Atty

UNITED STATES PATENT OFFICE.

HUGH M. PARSHALL, OF TIDIOUTE, PENNSYLVANIA.

IMPROVEMENT IN OIL AND LIQUID PUMPS.

Specification forming part of Letters Patent No. 179,864, dated July 18, 1876; application filed June 3, 1876.

*To all whom it may concern:*

Be it known that I, HUGH M. PARSHALL, of Tidioute, in the county of Warren and State of Pennsylvania, have invented certain new and useful Improvements in Pumps for Transferring Oils and Liquids from Barrels; and I do hereby declare the following to be a full, clear, and exact description of the invention, such as will enable others skilled in the art to which it pertains to make and use it, reference being had to the accompanying drawings, which form part of this specification.

My invention relates to an improvement in oil-pumps; and it consists in the manner of combining, with the pan that supports the measures to be filled, a wooden bung, whereby the pan is made to stick to the pump-tube, and the tube held rigidly in position, as will be more fully described hereinafter.

The accompanying drawing represents my invention.

$a$ represents the pump, which is adapted to be passed down through the bung-hole of a barrel; and $c$, the circular pan which surrounds the pump. In this pan is placed the support $d$, upon which the measures are set to be filled, and which support has an opening through it to allow the spilled oil to run back into the barrel again.

Heretofore these pans have been provided with tin bungs to fit the bung-hole of the barrel; but these bungs do not stick to the wood, and the consequence is that the pump is always working loose. In order to overcome this serious defect I make a flange, $e$, on the bottom of pan $c$, and which tightly grasps the pump, and concentric to this flange, but separated from it by a small space, is a shorter flange, $g$. In between these two flanges is forced the upper end of the hollow wooden bung $h$, the lower end of which is also made to clasp the pump-tube. The outer surface of this bung is made tapering, so as to fit any bung, and thus not only hold the pump in position, but prevent evaporation from the barrel. The surface of the bung being, in a measure, rough, it sticks firmly in the bung-hole, and as it clasps the pump-tube tightly the pump is held firmly in position. Where the bung is made of tin or metal, it is constantly working loose and the pump getting out of place.

I am aware that a packing of cork, wood, or rubber is not new, as applied to funnels, and this I disclaim. My invention consists in the peculiar manner of attaching the bung to the pan by means of the two flanges, so as to bind them securely together.

Having thus described my invention, I claim—

The combination of the pump $a$, pan $c$, having the two vertical flanges $e\ g$, bung $h$, having its upper end held between the said flanges, and support $d$, the parts being arranged for operation as shown.

In testimony that I claim the foregoing I have hereunto set my hand this 25th day of May, 1876.

HUGH M. PARSHALL.

Witnesses:
JOHN M. PARSHALL, Jr.,
S. C. PARSHALL.